United States Patent [19]
Dixon

[11] Patent Number: 5,142,542
[45] Date of Patent: Aug. 25, 1992

[54] SIGNAL-RESONANT INTRACAVITY OPTICAL FREQUENCY MIXING

[75] Inventor: George J. Dixon, Melbourne, Fla.

[73] Assignee: Amoco Corporation, Chicago, Ill.

[21] Appl. No.: 638,097

[22] Filed: Jan. 7, 1991

[51] Int. Cl.$^5$ .............................................. H01S 3/10
[52] U.S. Cl. ...................................... 372/22; 372/21;
372/92; 372/69; 359/326
[58] Field of Search ................ 372/21, 75, 22, 92;
307/424–427

[56] References Cited
U.S. PATENT DOCUMENTS

| | | | |
|---|---|---|---|
| 4,791,631 | 12/1988 | Baumert et al. | 372/69 |
| 4,879,722 | 11/1989 | Dixon et al. | 307/427 |
| 4,879,723 | 11/1989 | Dixon et al. | 372/21 |
| 4,880,996 | 11/1989 | Peterson et al. | 372/21 |
| 4,914,658 | 4/1990 | Stankov et al. | 372/21 |
| 4,942,587 | 7/1990 | Suzuki | 372/69 |
| 5,015,054 | 5/1991 | Chaffee | 372/21 |

*Primary Examiner*—Léon Scott, Jr.
*Attorney, Agent, or Firm*—Ekkehard Schoettle; William H. Magidson; Frank J. Sroka

[57] ABSTRACT

Disclosed is a method for generating coherent optical radiation by intracavity optical mixing in a cavity that is resonant for the radiation generated by the lasing of a lasant material and an input radiation.

40 Claims, 1 Drawing Sheet

SIGNAL-RESONANT INTRACAVITY OPTICAL FREQUENCY MIXING

FIELD OF THE INVENTION

This invention relates to the generation of a coherent optical radiation within the optical cavity of a laser by optical mixing wherein the signal input to the cavity is resonantly enhanced within the cavity.

BACKGROUND OF THE INVENTION

A laser is a device which has the ability to produce monochromatic, coherent light through the stimulated emission of photons from atoms, molecules or ions of an active medium which have been excited from a ground state to a higher energy level by an input of energy. Such a device contains an optical cavity or resonator which is defined by highly reflecting surfaces which form a closed, round trip path for light, and the active medium is contained within the optical cavity.

If a population inversion is created by excitation of the active medium, the spontaneous emission of a photon from an excited atom, molecule or ion undergoing transition to a lower energy state can stimulate the emission of photons of identical energy from other excited atoms, molecules or ions. As a consequence, the initial photon creates a cascade of photons between the reflecting surfaces of the optical cavity which are of identical energy and exactly in phase. A portion of this cascade of photons is then discharged through one or more of the reflecting surfaces of the optical cavity.

Excitation of the active medium of a laser can be accomplished by a variety of methods. However, the most common methods are optical pumping, use of an electrical discharge, and the passage of an electric current through the p-n junction of a semiconductor laser.

Semiconductor lasers contain a p-n junction which forms a diode, and this junction functions as the active medium of the laser. Such devices, which are also referred to as laser diodes, are typically constructed from materials such as gallium arsenide and aluminum gallium arsenide alloys. The efficiency of such lasers in converting electrical power to output radiation is relatively high and, for example, can be in excess of 40 percent.

The use of flashlamps, light-emitting diodes, laser diodes and laser diode arrays to optically pump or excite a solid lasant material is well known. Lasant materials commonly used in such solid state lasers include crystalline or glassy host materials into which an active material, such as trivalent neodymium ions, is incorporated. Detailed summaries of conventional crystalline lasant materials are set forth in CRC Handbook of Laser Science and Technology, Vol. I, M. J. Weber, Ed., CRC Press, Inc., Boca Raton, Fla., 1982, pp. 72-135 and in Laser Crystals, Vol. 14 of the Springer Series in Optical Sciences, D. L. MacAdam, Ed., Springer-Verlag, New York, N.Y., 1981. Conventional host materials for neodymium ion include glass, yttrium aluminum garnet ($Y_3Al_5O_{12}$ referred to as YAG), $YAlO_3$ (referred to as YALO) and $LiYF_4$ (referred to as YLF). By way of example, when neodymium-doped YAG is employed as the lasant material in an optically pumped solid state laser, it is typically pumped by absorption of light having a wavelength of about 808 nm and emits light having a wavelength of 1,064 nm.

U.S. Pat. No. 3,624,545 issued to Ross on Nov. 30, 1971, describes an optically pumped solid state laser composed of a YAG rod which is side-pumped by at least one semiconductor laser diode. Similarly, U.S. Pat. No. 3,753,145 issued to Chesler on Aug. 14, 1973, discloses the use of one or more light-emitting semiconductor diodes to end pump a neodymium-doped YAG rod. The use of an array of pulsed laser diodes to end pump a solid lasant material such as neodymium-doped YAG is described in U.S. Pat. No. 3,982,201 issued to Rosenkrantz et al. on Sep. 21, 1976. Finally, D. L. Sipes, Appl. Phys. Lett, Vol. 47, No. 2, 1985, pp. 74-75, has reported that the use of a tightly focused semiconductor laser diode array to end pump a neodymium-doped YAG results in a high efficiency conversion of pumping radiation having a wavelength of 810 nm to output radiation having a wavelength of 1,064 nm.

Materials having nonlinear optical properties are well known. For example, U.S. Pat. No. 3,949,323 issued to Bierlen et al. on Apr. 6, 1976, discloses that nonlinear optical properties are possessed by materials having the formula $MTiO(XO_4)$ where M is at least one of K, Rb, Ti and $NH_4$; and X is at least one of P or As, except when $NH_4$ is present then X is only P. This generic formula includes potassium titanyl phosphate, $KTiOPO_4$, a particularly useful nonlinear material. Other known nonlinear optical materials include, but are not limited to $KH_2PO_4$, $LiNbO_3$, $KNbO_3$, $\beta$-BaB-2$_4$, Ba$_2$NaNb$_5$O$_{15}$, LiIO$_3$, HIO$_3$, $KB_5O_8 \cdot 4H_2O$, potassium lithium niobate and urea. A review of the nonlinear optical properties of a number of different uniaxial crystals has been published in Sov. J. Quantum Electron, Vol. 7, No. 1, January 1977, pp. 1-13. Nonlinear optical materials have also been reviewed by S. Singh in the CRC Handbook of Laser Science and Technology, Vol. III, M. J. Weber, Ed., CRC Press, Inc., Boca Raton, Fla., 1986, pp. 3-228.

The nonlinear nature of the optical susceptibility of nonlinear optical materials provides a coupling mechanism between electromagnetic waves that simultaneously pass through the material and can be used to generate radiation by the interaction of these waves. As used in this application, the term "optical mixing" refers to the interaction within a nonlinear optical materials of two beams of light having frequencies $w_1$ and $w_2$ to produce optical radiation of a different frequency. For example, where $w_1$ is greater than $w_2$, this interaction can produce optical radiation at the sum-frequency, $w_3 = w_1 + w_2$, and the difference-frequency, $w_4 = w_1 - w_2$. These two processes are referred to as sum-frequency generation and difference-frequency generation, respectively. Up-conversion refers to the special case of sum-frequency generation where radiation of one frequency, for example $w_1$, is much more intense than that at $w_2$ and, accordingly, does not undergo any appreciable change in amplitude as optical mixing occurs to give optical radiation of wavelength $w_3$. Optical mixing also includes higher order processes such as $w_5 = w_1 + 2w_2$ and $w_6 = 2w_1 - 2w_2$. For the purposes of this application, the optical radiation produced by optical mixing is generically referred to as "optical mixing radiation."

Efficient optical mixing within a nonlinear optical material is not usually possible unless the wave vectors, $k_1$, $k_2$, and $k_3$, of the interacting waves satisfy the momentum conservation equation of phase-matching condition that requires:

$$k_3 = k_1 + k_2$$

Satisfying this phase-matching requirement is not possible in isotropic crystals with normal dispersion because the refractive indices of the three different waves will necessarily be different as a consequence of dispersion. However, many nonlinear optical materials posses an anisotropy of refractive index which can be utilized to satisfy the phase-matching condition for a desired type of optical mixing.

Optical mixing can be carried out either within or outside of an optical cavity. If the process is carried out within an optical cavity, that cavity can be either: (a) a component of one of the sources of radiation for the process, or (b) separate from any cavity utilized as a component of any source of radiation for the process. For convenience, the use of such a source cavity will hereinafter be referred to as an intracavity process, and the use of a separate cavity will be referred to as an external cavity process. For the purposes of this application, an optical cavity or resonator refers to a volume, which is bounded at least in part by highly reflecting surfaces, wherein light of certain discrete frequencies can set up standing wave modes of low loss.

The up-conversion of infrared radiation to the visible and ultraviolet range has been extensively studied. Such studies have been primarily motivated by an interest in using this technique to permit the detection and analysis of infrared radiation by the conventional and efficient method that are available for light of higher frequency. Since the up-converted radiation carries essentially all of the information of the input infrared radiation, potential applications include infrared signal detection, infrared spectral analysis and infrared holography.

Up-conversion of infrared radiation has been reviewed by E. S. Voronim et al., Sov. Phys. Usp., Vol. 22, No. 1, pp. 26–45 (January 1979) and J. Warner, "Difference Frequency Generation and Up-Conversion" in Quantum Electronics, Vol., 1, Nonlinear Optics, Part B, H. Rabin and C. L. Tang, Ed., Academic Press, New York, pp. 703–737 (1975). A theoretical discussion of infrared detection by sum-frequency generation has also been published by D. A. Kleinman et al., J. Appl. Phys., Vol. 40, No. 2, pp. 546–566 (February 1969).

At page 34 of their previously-cited review article, E. S. Veronin et al;, describe the up-conversion of infrared radiation from a $CO_2$ laser within the cavity of a YAG:Nd $3+$ laser using proustite as the nonlinear optical material. In addition, E. Liu et al., Applied Optics, Vol. 21, No. 19, pg. 3415–3416 (Oct. 1, 1982) have reported the generation of radiation at wavelengths in the range from 252 nm to 268 nm by intracavity sum-frequency generation in a 90° phase-matched temperature-tuned ammonium dihydrogen phosphate crystal, of selected output lines from an argon ion laser and the traveling wave in a rhodamine 110 ring dye laser. Further, U.S. Pat. No. 3,646,358, issued to Firester on Feb. 29, 1972 discloses the up-conversion of signal radiation from an external source within the cavity of a laser wherein the polarization of the signal beam is orthogonal to that of the pump beam which is generated within the laser cavity. Difference-frequency generation has been reviewed in the above-cited review article in Quantum Electronics, Vol. 1, at pp. 735–736 and by R. L. Aggarwal et al., in Nonlinear Infrared Generation, Y. R. Shen, Ed., Springer-Verlag, Berlin, pp. 19–38 (1977).

There is a current need for efficient, compact and reliable lasers which operate in the infrared, visible and ultraviolet portion of the spectrum and are capable of modulation rates over the range from 0 Hz to in excess of 1 GHz over a wide range of intensities. Such devices would be useful for applications which include optical storage of data, reprographics, spectroscopy and communications. For example, the storage of data on optical disks requires a source of coherent radiation which can be modulated at a rate between about 5 and about 20 MHz, and such radiation is desirably in the visible or ultraviolet portion of the spectrum in order to maximize data storage within a given area. In addition, compact coherent sources of red, green and blue light would be highly attractive for television applications requiring a high brightness source. The use of three such lasers in place of the red, green and blue electron guns of a conventional television picture tube would result in a high brightness television projector that would be useful in simulation systems and large screen television systems. Laser diodes possess all of the above-described capabilities except for one—their output is in a limited part of the infrared portion of the electromagnetic spectrum at wavelengths in the range from about 750 nm to about 1600 nm.

In this connection, U.S. Pat. No. 4,879,723 (Dixon et al.) discloses an efficient, compact source of coherent radiation in the infrared, visible and ultraviolet portion of the spectrum which is capable of modulation rates over the range from 0 Hz to exceed of 1 GHz. The radiation is produced by optical mixing within the optical cavity of a laser by introducing input radiation into the optical cavity where: (a) the cavity is that of a diode pumped solid state laser, and/or (b) input radiation is provided by a solid state device selected from the group consisting of laser diodes, laser diode arrays and diode-pumped solid-state lasers. The subject patent discloses a specific embodiment wherein a diode laser or diode laser array emits radiation having a wavelength near 810 nm which is focused and used to end pump a lasing medium. The lasing medium output radiation wavelength is 1064 nm where in this case, the medium is neodymium-doped YAG. A second laser diode or laser diode array, emitting radiation having a wavelength of 808 nm is simultaneously pumped into the laser cavity and mixed with the radiation emitting from the lasing medium in a nonlinear optical material to generate sum or difference frequencies. Preferably, the sum-frequency generation of visible blue light having a wavelength of 459 nm is the optical mixing radiation.

Along the same vein, U.S. Pat. No. 4,791,631 (Baumert et al.) discloses a process for producing a beam of coherent radiation at essentially 459 nm by mixing in a nonlinear optical crystal (KTP), two laser beams, one at 1064 nm and the other 808 nm. Specifically, intracavity radiation at 1064 nm is generated when a semiconductor diode laser beam at 808 nm is passed through a nonlinear optical crystal, KTP, situated within the cavity and then pumped into a neodymium-doped YAG laser crystal. The laser beam having the 808 nm wavelength used in the mixing can be derived either from the pump beam or a second semi-conductor diode laser whose light is coupled with the 1064 nm beam using a beam splitter.

Finally, U.S. Pat. No. 4,879,722 (Dixon et al.) also discloses a mixing process wherein optical mixing radiation is produced by optical mixing within an external optical cavity wherein at least one of the interacting beams of light is provided by a solid state device selected from the groups consisting of laser diodes, laser diode arrays and diode-pumped solid state lasers. The external optical cavity can be resonant for either or both of the input radiation to the cavity. The term "external optical cavity" in the subject patent pertains to a cavity that is separate from any cavity used as a component of any sources of radiation for the process.

While the mixing processes and devices described above in the Dixon et al. and Baumert et al. patents are effective, they are relatively inefficient when compared, for instance, to intracavity-doubled, diode-pumped solid state lasers and external resonantly doubled diode lasers. Thus there is a need for improved optical mixing devices and processes that retain the desirable properties of high speed modulation, limited tunability, and a broad range of possible output wavelengths but concomitantly possess enhanced output efficiency. Further, there is a need for devices and processes that can produce coherent radiation at 459 nm (blue) using sum frequency mixing techniques based on the use of robust crystals, i.e. KTP and Nd:YAG, which crystals can be expected to perform well in a commercial product.

It has now been discovered that when both inputs to the mixing process are resonantly enhanced, in contradistinction to the prior art teachings where only one of the inputs to the mixing process is resonantly enhanced, output efficiency of the mixing process can be substantially increased.

SUMMARY OF THE INVENTION

The present invention is directed to an efficient, compact and reliable laser which can be operated in the infrared, visible and ultraviolet portion of the spectrum and is capable of modulation rates over the range from 0 Hz to in excess of 1 GHz.

In a broad aspect, the present invention provides for the generation of coherent optical radiation by intracavity optical mixing in a cavity that is both resonant for radiation generated by the lasing of a lasant material within the cavity and an input radiation wherein the intracavity mixing is carried out with the lasing radiation and the input radiation in a nonlinear optical material within the cavity.

One embodiment of the invention is a method for generating coherent optical radiation which comprises: (a) generating coherent optical radiation of a first frequency, $w_1$, from a lasant material which is contained within an optical cavity which is resonant with respect to radiation of the first frequency, $w_1$; (b) generating coherent optical radiation of a second frequency, $w_2$; c) introducing the radiation of a second frequency into the optical cavity which is also resonant with respect to radiation of the second frequency $w_2$; and (c) interacting the radiation of a first frequency and the radiation of a second frequency with a nonlinear optical material which is contained within the optical cavity to generate coherent optical radiation of a third frequency, $w_3$.

Another embodiment of the present invention involves the above method wherein a portion of the radiation of a second frequency, $w_2$, is used to optically pump the lasant material and another portion of the radiation of a second frequency, $w_2$, is used to interact with the radiation of a first frequency, $w_1$ with the nonlinear optical material to generate the radiation of a third frequency, $w_3$.

Another embodiment of the invention is a method for generating coherent optical radiation which comprises: (a) generating optical pumping radiation from a source which is selected from the group consisting of laser diodes, laser diode arrays, diode-pumped solid state lasers and diode-pumped semiconductor lasers; (b) generating coherent optical radiation of a first frequency, $w_1$, by optically pumping a lasant material with the optical pumping radiation, wherein the lasant material is contained within an optical cavity which is resonant with respect to the radiation of the first frequency, $w_1$; (c) generating coherent optical radiation of a second frequency, $w_2$; (d) introducing the radiation of a second frequency into the optical cavity which is resonant with respect to radiation of the second frequency; and (e) interacting the radiation of a first frequency and the radiation of a second frequency with a nonlinear optical material which is contained within the optical cavity to generate coherent optical radiation of a third frequency, $w_3$.

A further embodiment of the present invention involves any of the above methods wherein the radiation of a second frequency is generated from a source selected from the group consisting of laser diodes, laser diode arrays, diode-pumped solid state lasers and diode-pumped semiconductor lasers.

Another embodiment of the invention is an apparatus for generating coherent optical radiation which comprises: (a) means for generating coherent optical radiation of a first frequency, $w_1$, within an optical cavity which is resonant with respect to the radiation of a first frequency; (b) means for generating coherent optical radiation of a second frequency, $w_2$, which is located outside of the optical cavity wherein the cavity is also resonant for the radiation of a second frequency; (c) means for introducing the radiation of a second frequency into the optical cavity; and (d) nonlinear optical means within the optical cavity which is positioned to interact with the radiation of a first frequency and the radiation of a second frequency to generate coherent optical radiation of a third frequency, $w_3$.

A further embodiment of the invention is an apparatus for generating coherent optical radiation which comprises: (a) optical pumping means for generating optical pumping radiation which is selected from the group consisting of laser diodes, laser diode arrays, diode-pumped solid state lasers and diode-pumped semiconductor lasers; (b) lasant material which is contained within an optical cavity, positioned to receive pumping radiation from the optical pumping means and capable of producing coherent optical radiation of a first frequency, $w_1$, upon being pumped by the pumping radiation wherein the optical cavity is resonant with respect to the radiation having a frequency, $w_1$; (c) means for generating coherent optical radiation of a second frequency, $w_2$, which is located outside of the optical cavity wherein the cavity is also resonant for the radiation of a second frequency; (d) means for introducing the radiation of a second frequency into the optical cavity; and (e) nonlinear optical means within said optical cavity which is positioned to interact with said radiation of a first frequency and said radiation of a second frequency to generate coherent optical radiation of a third frequency, $w_3$.

Yet another embodiment of the invention is the above apparatus wherein the optical pumping means and the means for generating optical radiation of a second frequency are the same means, wherein a portion of the radiation having a second frequency generated by this means is used to pump the lasant material while another portion of the radiation having a second frequency is used to interact with the radiation of a first frequency.

A still further embodiment of the present invention involves either of the first two apparatus embodiments mentioned above wherein the means for generating radiation of a second frequency is generated from a source selected from the group consisting of laser diodes, laser diode arrays, diode-pumped solid state lasers and diode-pumped semiconductor lasers.

DETAILED DESCRIPTION OF THE PREFERRED EMBODIMENTS

Figure 1:
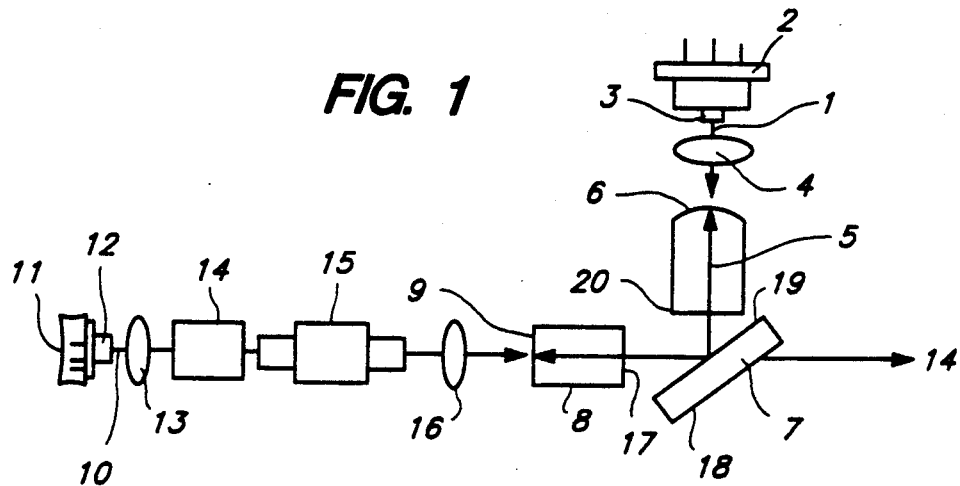
FIG. 1 of the drawings is a schematic representation of one embodiment of the invention.
Figure 3:
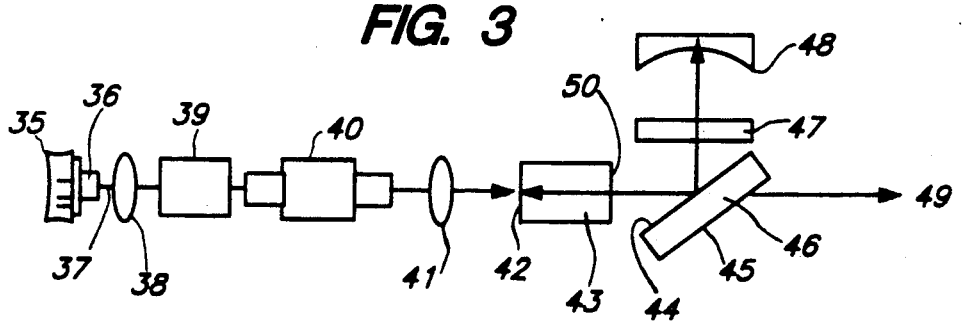
FIG. 3 of the drawings is a schematic representation of a second embodiment of the invention.
Figure 4:
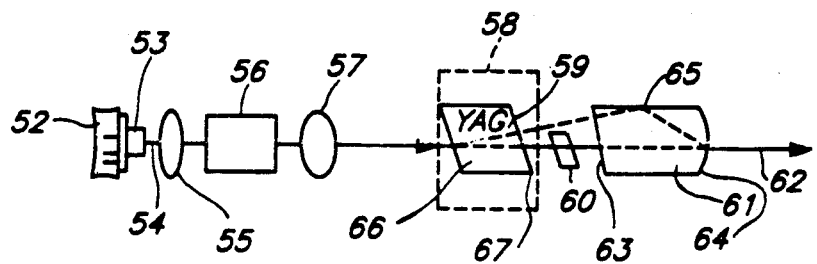
FIG. 4 of the drawings is a schematic representation of a third embodiment of the invention.

While this invention is susceptible of embodiment in many forms, there are schematically shown in FIGS. 1, 3 and 4, three specific embodiments, with the understanding that the present disclosure is not intended to limit the invention to the embodiments illustrated.

Further, the following specific embodiments are restricted to solid-state devices, however it should be understood that the present invention is not restricted to any signal or laser sources. In particular, signal resonance in accordance with the present invention can be achieved in gas, liquid or solid-state lasers. If the gain medium is strongly absorbent of the pump radiation, as for instance in the case of a dye laser, the present invention contemplates the resonant enhancement of the pump radiation in a cavity separate from the main laser cavity.

With reference to FIG. 1, optical pumping radiation 1 from an optical pumping means represented by the combination of 2 and 3 is focused by lens 4 onto lasant material 5 which has a suitable reflective coating on surface 6 and is capable of being pumped by the light from pumping means (2 and 3). Light emitted by the lasing of lasant material 5 is reflected off a suitable coating on 90-degree bending mirror 7 and through nonlinear optical material 8, which has a suitable reflective coating on surface 9. Laser action by lasant material 5 occurs in the resonator or optical cavity which is formed by the reflective coatings on mirror 7 and on surfaces 6 and 9. Coherent input radiation 10 from a radiation source represented by the combination of 11 and 12 is collimated by collimating lens means 13 and then circularized, by circularizing means 14 before being mode matched to the radiation generated by the lasing of the lasant material 5.

Generally, a focusing element is desirable between the diode laser and the resonant cavity to mode match the diode to the intracavity mode of the solid state laser. There are, however, some configurations of laser and diode which can eliminate this element. However, the laser configuration in such cases would be different than that shown in the FIG. 1. In the specific embodiment depicted in the Figure, the collimating and focusing lenses can be combined into a single imaging element with the elimination beam circularizer. The result of not using the circularizer would be a reduction in output power due to a poor mode match between the astigmatic elliptical Guassian mode from the diode laser and the circular Gaussian mode of the slid state laser. However, in some cases the reduction in device complexity may more than offset the reduced power.

Optical isolation means 15 is inserted between circularizing means 14 and focusing lens 16 to stabilize radiation 10 against back reflections from the surface 9 of nonlinear optical material 8. Optical isolation means 15 serves to prevent any reflection of input radiation 10 back to its radiation source 11 and 12 from the cavity defined by the reflective coatings on mirror 7 and on surfaces 6 and 9. Such back-reflection will have an undesirable tendency to produce amplitude and frequency fluctuations in the output of radiation from sources 11 and 12. Any conventional means for effecting optical isolation of source 11 and 12 can be used. For example, means 15 can be a Faraday isolator or a quarter wave plate. It will be appreciated, however, that optical isolation of the input sources is not essential to the practice of this invention and merely represents a preferred embodiment. Coherent input radiation 10 from a radiation source 11 and 12 is focused by lens 16 onto surface 9 of nonlinear optical material 8 in such a manner that the overlap between input radiation 10 and the radiation generated by the lasing of lasant material 5 (cavity radiation) is maximized. Nonlinear optical material 8 is phase-matched for the desired optical mixing process between input radiation 10 and the cavity radiation (for example, sum-frequency generation). The resulting optical mixing radiation is passed through 90-degree bending mirror 7 as output radiation 14.

In accordance with the invention the optical cavity defined by reflective coatings on mirror 7 and on surfaces 6 and 9 is resonant for both the radiation emitted by the lasing of lasant material 5 and input radiation 10. In order to render the subject cavity resonant for both the radiation emitted by the lasant material 5 and input radiation 10, surface 6 and bending mirror inner surface 19 are highly reflective of radiation from lasant material 5 and radiation 10. Surface 9 is highly reflective for the radiation generated by the lasant material 5 and will be marginally reflective, e.g. about 1–25% for input radiation 10. This transmittance can in theory be adjusted to give a zero back reflection of input radiation 10, however, this condition is difficult to achieve in practice. This radiation source 11 and 12 is isolated by the use of optical isolator means 15; such an isolator, as explained above, is not required for this embodiment unless there is significant back reflection of input radiation 10.

Additionally, in order to render the subject cavity resonant for both the radiation generated by the lasant material 5 and input radiation 10, the cavity must satisfy the Fabry-Perot resonance condition for the respective radiations. Frequency-matching to satisfy the resonance condition can be achieved by methods well-known to those skilled in the art such as by adjusting the optical path length of the cavity by conventional means, for example, temperature variation or electro-mechanical means, such as a piezoelectric translator mounting for the cavity mirrors. Frequency-matching into a resonant cavity is also described in G. J. Dixon, C. E. Tanner, and C. E. Wieman, Opt, Lett., 14, 731 (1989) the teachings of which are incorporated herein by reference.

Suitable optical pumping means (2 and 3) include, but are not limited to, laser diodes, light-emitting diodes (including superluminescent diodes and superluminescent diode arrays), laser diode arrays, diode-pumped solid state lasers and diode-pumped semiconductor lasers together with any ancillary packaging or structures. For the purposes hereof, the term "optical pumping means" includes any heat sink thermoelectric cooler or packaging associated with said laser diodes, light-emitting diodes and laser diode arrays. For example, such devices are commonly attached to a heat resistant and conductive heat sink and are packaged in a metal housing. For efficient operation, the pumping radiation 1 emitted by the optical pumping means is desirably matched with a suitable absorption band of the lasant material 5. Although the invention is not to be so limited, a highly suitable optical pumping source consists of a gallium aluminum arsenide laser diode 3, which emits light having a wavelength of about 810 nm, that is attached to heat sink 2. Heat sink 2 can be passive in character. However, heat sink 2 can also comprise a thermoelectric cooler or other temperature regulation means to help maintain laser diode 3 at a constant temperature and thereby ensure optimal operation of laser diode 3 at a constant wavelength. It will be appreciated, of course, that during operation the optical pumping means will be attached to a suitable power supply. Electrical leads from laser diode 3, which are directed to a suitable power supply, are not illustrated in FIG. 1.

Lens 4 serves to focus light from laser diode 3 onto lasant material 5. This focusing results in a high pumping intensity and an associated high photon to photon conversion efficiency in lasant material 5. Any conventional optical means for focusing light can be used in place of simple lens 4. For example, a gradient index lens, a ball lens, an aspheric lens or a combination of lenses can be utilized. It will be appreciated, however, that lens 4 is not essential to the practice of this invention and the use of such focusing means merely represents a preferred embodiment.

Any conventional lasant material 5 can be utilized provided that it is capable of being optically pumped by the optical pumping means selected. Suitable lasant materials include, but are not limited to, solids selected from the group consisting of glassy and crystalline host materials which are doped with an active material. Highly suitable active materials include, but are not limited to, ions of chromium, titanium and the rare earth metals. Highly suitable lasant materials include neodymium-doped YAG, neodymium-doped YALO lithium neodymium tetraphosphate and neodymium-doped YLF. By way of specific example, neodymium-doped YLF is a highly suitable lasant material 5 for use in combination with an optical pumping means which produces light having a wavelength of about 792 nm. When pumped with light of this wavelength, neodymium-doped YLF can emit light having a wavelength of 1,047 nm.

In FIG. 1, lasant material 5 is shown with a convex input surface 6. This convex surface serves to improve the resonator stability and also serves to create an output beam from lasant material 5 which has an optimized waist for efficient optical mixing within nonlinear optical material 8. However, convex input surface 6 is not necessary. The precise geometric shape of lasant material 5 can vary widely. For example, lasant material 5 can be rod-shaped or rhombohedral in shape if desired, and lens-shaped surfaces can be used if desired. Indeed, one embodiment of the invention involves the use of a fiber of lasant material which is end pumped by the optical pumping means. Highly suitable fibers for this purpose include, but are not limited to, glass optical fibers which are doped with ions of a rare earth metal such as neodymium. The length of such a fiber is easily adjusted to result in absorption of essentially all of the light from the optical pumping means. If a very long fiber is required, it can be coiled, on a spool for example, in order to minimize the overall length of the laser of this invention.

Light emitted by the lasing of lasant material 5 is passed into nonlinear optical material 8 where it interacts with coherent radiation 10 from radiation source 11 and 12. By means of proper orientation of the crystal structure of the nonlinear optical material 8 with respect to the optical path of the interacting optical radiation (referred to as phase matching), efficient optical mixing of the desired type occurs. In addition, phase matching can be optimized and controlled by adjustment and control of the temperature of the nonlinear optical material. By way of specific example, infrared radiation having a wavelength of 1047 nm from a neodymium-doped YLF lasant material 5 can be combined in nonlinear optical material 8 with light having a wavelength of 846 nm from radiation source 11 and 12 to produce by sum-frequency generation visible blue light having a wavelength of 468 nm. In this specific example, the nonlinear optical material 8 can be potassium titanyl phosphate with Type II phase matching.

The geometric shape of nonlinear optical material 8 can vary widely. For example, it can be rod-shaped or rhombohedral in shape and can have lens-shaped faces if desired. It will also be appreciated that any such nonlinear optical component can comprise heating or cooling means to control the temperature of said nonlinear optical material and thereby optimize the phase matching. Noncritical phase matching is usually preferred when possible due to elimination of pointing vector walk-off.

Potassium titanyl phosphate, $KTiOPO_4$, is a highly preferred nonlinear optical material. However, it will be appreciated that any nonlinear optical material can be utilized in the practice of this invention. Suitable nonlinear optical materials include, but are not limited to, $KH_2PO_4$, $LiNbO_3$, neodymium-doped yttrium aluminum borate (NYAB) (note that NYAB can simultaneously be used as a suitable lasant material), yttrium aluminum borate (YAB), $BaNaO_{15}$, MgO-doped lithium niobate, $KNbO_3$, $\beta$-$BaB_2O_4$, $Ba_2NaNb_5O_{15}$, $LiO_3$, $HIO_3$, $KB_5O_8 \cdot 4H_2O$, potassium lithium niobate, urea and compounds of the formula $MTiO(XO_4)$ where M is selected from the group consisting of K, Rb and Tl, and X is selected from the group consisting of P and As.

It will be appreciated, of course, that for radiation of two different frequencies, $w_1$ and $w_2$, the phase-matching conditions will ordinarily be different for each type of optical mixing process in a given nonlinear optical material. For example, where $w_1$ is greater than $w_2$, the phase-matching conditions for sum-frequency generation ($w_3 = w_1 + w_2$) will ordinarily be different from those for difference-frequency generation ($w_4 = w_1 - w_2$) since $w_3$ and $w_4$ are different. Indeed, satisfactory phase-matching conditions and optical transparency may exist for certain optical mixing processes but not others in a given nonlinear optical material. Accordingly, the desired optical mixing process can be obtained by control of the phase-matching conditions. The procedures and criteria for the selection and phase matching of nonlinear optical materials for a given optical mixing process are conventional.

Lens 16 serves to focus input radiation 10 onto nonlinear optical material 8 in such a manner that the production of radiation by optical mixing is optimized. Any conventional optical means for focusing light can be used in place of simple lens 16. For example, a gradient index lens, a ball lens, an aspheric lens or a combination of lenses can be utilized. It will be appreciated, however, that lens 16 is not essential to the practice of this invention, and the use of such focusing means merely represents a preferred embodiment.

Radiation source 11 and 12 can be any source of coherent radiation. However, preferred radiation sources include laser diodes, laser diode arrays, diode-pumped solid state lasers and diode-pumped semiconductor lasers together with any ancillary packaging or structures. In connection with the present invention the term "diode-pumped solid state laser" pertains to lasers wherein insulated crystals are used as the lasant material, whereas the term "diode-pumped semiconductor laser" pertain to lasers wherein a semiconductor is used as the lasant material. For example, such devices are commonly attached to a heat resistant and conductive heat sink and are packaged in a metal housing A highly suitable radiation source consists of a gallium aluminum arsenide laser diode 12 which is attached to heat sink 11. Heat sink 11 can be passive in character. However, heat sink 11 can also comprise a thermoelectric cooler of other temperature regulation means to help maintain laser diode 12 at constant temperature and thereby ensure optimal operation of laser diode 12 at a single wavelength. It will be appreciated, of course, that during operation the optical pumping means will be attached to a suitable power supply. Electrical leads from laser diode 12, which are directed to a power supply, are not illustrated in FIG. 1.

Conventional laser diodes and laser diode arrays are available which produce output radiation having a wavelength over the range from about 660 1 nm to about 1600 nm, and any such device can be used in the practice of this invention as the source of input radiation 10. One example is a 670 nm, AlGaInP diode laser that possesses a useable emission range from 660 to 700 1 nm. GaAlAs devices can also be used to provide radiation in the wavelength range from about 750 nm to about 900 nm, and InGaAsP devices can be used to provide radiation in the wavelength range from about 1000 nm to about 1600 nm. With such a range wavelengths (750–1600 nm) used in combination with radiation from rare earth metal laser transition in lasant material 5 (for example, 1319 nm and 1064 nm from neodymium transitions) output radiation 14 produced by sum-frequency generation can be varied over the range from about 440 nm to beyond 650 nm.

A laser diode or laser diode array typically can be tuned over a wavelength range of about 10 nm by adjusting and controlling its operating temperature. Accordingly, when such a device is used to provide input radiation 10, the optical mixing output radiation 14 can be tuned over a modest wavelength range by temperature tuning the laser diode or laser diode array. In view of this, a preferred embodiment of the invention involves tuning the wavelength of output radiation 14 by adjusting and controlling the temperature of the laser diode or laser diode array 12 which is used to provide input radiation 10. Alternatively, the laser diode or laser diode array can be tuned over a small range of wavelengths by varying the current which is applied to the device. Such tuning will, of course, usually require an adjustment to optimize the phase-matching conditions in nonlinear optical material 8. In noncritically phase-matched, temperature-tuned nonlinear optical materials, this can be easily accomplished by merely adjusting the temperature of the nonlinear optical material.

If desired, radiation source 11 and 12 can be a diode-pumped solid state laser. Suitable diode pumping means for such a laser include laser diodes, light-emitting diodes and laser diode arrays. In addition, the diode-pumped solid state laser can comprise any conventional solid lasant material which can be optically pumped by the selected diode pumping means. Although the invention is not to be so limited, a highly satisfactory diode-pumped solid state laser is a neodymium-doped YAG laser which is optically pumped by a laser diode array and is frequency doubled using a potassium titanyl phosphate nonlinear optical component to produce output radiation having a wavelength of 532 nm. Such a device is described in U.S. Pat. No. 4,653,056 issued to Baer et al., on Mar. 24, 1987. The combination of such 532 nm radiation as input radiation 10 with radiation having a wavelength of 1319 nm from a neodymium-doped YAG lasant material 5 can be used to generate sum-frequency output radiation 14 which is in the near-ultraviolet portion of the spectrum at a wavelength of 379 nm.

As mentioned above, the reflective coating on surface 6 of lasant material 5 is selected in such a manner that it is substantially transparent to optical pumping radiation 1 but highly reflective with respect to light emitted by the lasing of lasant material 5 and input radiation 10. The reflective coating on surface 9 of nonlinear optical material 8 is selected in such a manner that it is partially transparent and marginally reflective with respect to input radiation 10 but highly reflective with respect to light emitted by the lasing of lasant material 5. The reflective coating on inner surface 19 of 90°-bending mirror 7 is selected in such a manner that it is highly reflective for light emitted by the lasing of lasant material 5 and input radiation 10 but substantially transparent to output radiation 14 which is produced by the optical mixing. The user surface 18 of bending mirror 7 possess a coating that is antireflective with respect to output radiation 14. The intracavity face 20 of lasant material 5 possesses a coating that is antireflective with respect to the radiation emitted by the lasing of lasant material 5 and input radiation 10 while the inner surface coating 17 of the nonlinear optical material 8 is antireflective with respect to the lasing radiation and input radiation 10 and highly transparent with respect to output radiation 14. The above-described coatings are conventional in character and can, for example, be dielectric coatings.

In another embodiment of the invention, input radiation 10 and radiation produced by the lasing of lasant material 5 are both polarized and the polarizations adjusted in such a manner that the efficiency of optical mixing in nonlinear optical material 8 is optimized. For example, with sum-frequency generation, these polarizations should be orthogonal for Type II phase matching and identical for Type I phase matching. If unpolarized, the radiation produced by the lasing of lasant material 5 can be polarized by any conventional intracavity means. For example, a polarization-dependent coating can be applied to 90°-bending mirror 7 for this purpose. Alternatively, lasant material 5 can be selected in such a manner that it inherently produced polarized light upon lasing. For example, suitably oriented neodymium-doped YALO and YLF produce polarized light whereas neodymium-doped YAG does not.

Input radiation 10 can be polarized by any conventional means. For example, coherent radiation from conventional laser diodes and conventional multistripe laser diode arrays is inherently polarized. Accordingly, if such a device is used to provide input radiation 10 and radiation from lasant material 5 is polarized by intracavity polarizing means, then adjustment of the polarizations with respect to each other can be accomplished by either rotation of the diode device or rotation of the intracavity polarizing means.

Modulation of the optical mixing output radiation 14 can be easily accomplished by modulating input radiation 10. When a laser diode or laser diode array is used to provide input radiation, such modulation can be effected by modulation of the power supply to the laser diode or laser diode array. Conventional means are available for modulating the output from laser diodes and laser diode arrays over the range from 0 Hz to in excess of 1 GHz, and the use of all such modulation means represents a preferred embodiment of the invention. Alternatively, the optical mixing output radiation 14 can be modulated by modulating the light emitted by the lasing of lasant material 5 through conventional techniques such as Q-switching, gain switching (by modulating optical pumping radiation 1) or mode locking. Yet another option involves modulating both the light emitted by the lasing of the lasant material and input radiation.

It will be appreciated that 90°-bending mirror 7 is not an essential element of the invention. In the absence of 901-degree bending mirror 7, any convenient method can be utilized to: (a) combine input radiation 10 and radiation from lasant material 5 in nonlinear material 8, and (b) withdraw the radiation produced by optical mixing from the optical cavity defined by the reflective coatings on surfaces 6 and 9.

In a specific example of the embodiment illustrated in FIG. 1, a Nd:YLF laser operating at 1047 nm is optically pumped by the output of a large optical cavity diode laser of diode laser array (2,3) which has an output wavelength that is matched to the Nd:YLF absorption at 792 nm (radiation 1). The polarization of the pump source is adjusted to maximize the absorption coefficient in the Nd:YLF gain material 5 and is focused so that it is predominantly absorbed within the $TEM_{00}$ mode volume of the Nd:YLF laser. A three-mirror optical cavity, which is resonant at the 1047 nm laser wavelength, is formed by the input face 6 of the Nd:YLF gain material, the 90° bending mirror 7 and the outer face 9 of a KTP crystal 8.

The pump face 6 of the Nd:YLF crystal is polished to a 300 mm convex radius of curvature and coated for high reflectivity at 1047 nm and 846 nm and high transmission at 792 nm while the inner surface 20 is flat and antireflective-coated at 1047 nm and 846 nm. The 90° bending mirror inner surface 19 is for high reflectivity at 1047 nm and 846 nm and high transmission at 468 nm and antireflective coated at 468 nm on outer surface 18. The angle of incidence for the coatings on both surfaces of the bending mirror is 45°. The faces of the KTP crystal 8 are polished flat and parallel with an orientation to the crystallographic axes which guarantees that propagation of the single input and the intracavity field in a direction perpendicular to the polished faces will lead to phase-matching sum frequency mixing. The outer face 9 of the KTP crystal is coated for high reflectivity at 1047 nm and 1%–25% reflectivity at 846 nm while the inner face 17 is antireflective-coated for both 1047 and 846 nm and high transparency at 468 nm.

The signal input 10 from a single stripe diode laser operating at 846 nm is collimated (13) and circularized (14) before being mode-matched to the 1047 nm, $TEM_{00}$ mode of the Nd:YLF laser. Sufficient optical isolation (15) is inserted between the circular and the focusing lens(es) to stabilize the signal input against the back reflections from the surface of KTP crystal 8 and other intracavity surfaces. The 468-nm sum frequency output from this device is emitted through the right angle bending mirror in a direction which is collinear to the signal input.

A typical signal-to-output conversion efficiency for the above described device wherein the input signal is not resonantly enhanced in accordance with the present invention for a 500 mW pump source would be in the range of 0.2%–0.5%. The overall optical conversion efficiency is significantly less than this since the 500-mW pump input would have to be factored in. This can be unfavorably compared to the 10%–15% pump conversion efficiency of an intracavity-doubled Nd:YAG laser and the 40%–50% optical conversion efficiency of an external, resonantly doubled diode laser.

A significant increase in the output conversion efficiency of the sum frequency upconverter depicted in FIG. 1 is possible when the signal input is resonantly enhanced within the cavity of the diode-pumped solid state laser in accordance with the present invention. Because the Hd:YLF gain medium is transparent to the 846-nm signal input, one can turn the optical cavity of the Nd:YLF laser into a low-loss passive buildup cavity for the signal input by changing the coating on the component surfaces as set out above.

The principles of enhancing the output from a laser diode in an external resonant cavity have been described in a number of papers and in U.S. Pat. Nos. 4,884,276 and 4,879,722 (Dixon et al.). Because the sum frequency output power is linearly proportional to the signal input power in the low conversion efficiency limit, resonant enhancement of the signal input is expected to increase the efficiency of the sum frequency upconverter by the ratio of intracavity signal power to input power.

While not an essential feature with respect to the present invention it is preferably to impedance match as specifically explained below. If one assumes that the intracavity losses at the signal wavelength due to sum frequency conversion and passive losses are equal to 5%, the reflectivity of the outer face 9 of the KTP crystal 8 at the signal wavelength is 5% (impedance matched case), and input signal 10 is perfectly matched to the $TEM_{00}$ mode of the laser resonator, one can expect an increase in output conversion efficiency of approximately 20 times. If one can impedance match the intracavity losses at a lower input reflectivity, then this value can be further increased. In the case of the 100-mW single-stripe diode laser signal source (11 and 12), the output power of a non-signal-resonant upconverter would be between 200 and 500 μW, while the signal-resonant device of the present invention with an intracavity signal enhancement of 20 times can have an output power of 4 to 10 mW. From a practical standpoint, an outer power in the 4 to 10 mW range is suitable for a large number of applications while the 200 uW has a more limited range of potential commercial applications.

While FIG. 1 clearly depicts an embodiment of the present invention, the present invention also encompasses ring resonator configurations that eliminate the bending mirror and optical isolator in the signal path.

Figure 2:
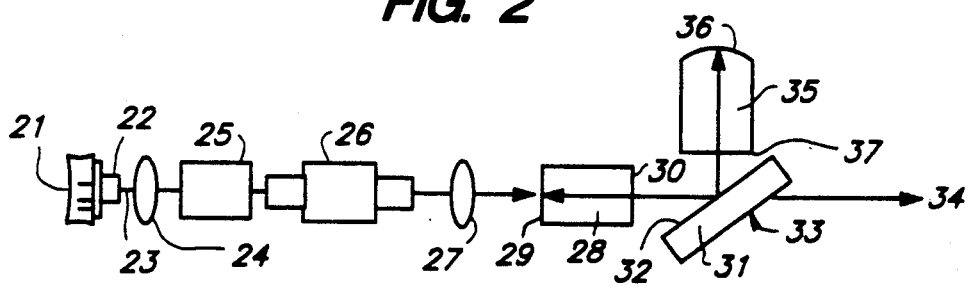
FIG. 2 of the drawings is a schematic representation of a comparative device.

FIG. 2 shows a comparative nonresonant, single-input frequency laser in which a single input laser serves as the signal input to the device and the source of excitation for a 1064 nm pump laser. The essential elements include a KTP nonlinear optical crystal 28, bending mirror 31 and lasant material 35, and a Nd:YAG rod. Input radiation 23 having a wavelength of 808-nm is focused through the KTP crystal 28 and reflected by the bending mirror 33 before being absorbed in the Nd:YAG lasant material 35. Radiation 23 having a wavelength of 808 nm emitted by a diode laser shown as 21 and 22 and the radiation at 1064 nm emitted by Nd:YAG lasant material 35 have polarizations adjusted for TYPE II phase matching in the KTP crystal 28 as described in U.S. Pat. No. 4,791,631 (Baumert et al.), the teachings of which are incorporated herein by reference.

Diode laser radiation output 23 is collimated (24) and circularized (25) before being mode matched to the $TEM_{00}$ mode of the 1064 nm laser and a sufficient degree of optical isolation (26) is inserted between the diode laser and the laser cavity to eliminate backreflection-induced instabilities.

KTP crystal 28 is polished flat and parallel and coated on the input face 29 for high reflectivity at 1064 nm and high transmission at 808 nm. Intracavity face 30 has an antireflective coating for both 1064 nm and 459 nm. Bending mirror 31 is coated for high transmission at 459 nm output radiation 34 and high reflectivity at both 808 nm and 1064 nm at a 45° angle of incidence on inside surface 32. The coating on this mirror is designed so there is greater than 1% differential reflectivity between the S and P polarizations at 1064 nm and outer surface 33 has antireflective coating for 459 nm radiation at a 45° angle of incidence. Inner surface 37 of the Nd:YAG lasant material 35 is polished flat and has an antireflective coating for 1064 nm and 808 nm radiation, while outer surface 36 is polished with a 50 mm radius of curvature and coated for high reflectivity at 1064 nm radiation.

In this nonresonant comparative device, the input radiation 23 passes through KTP nonlinear optical crystal 28 in a polarization orthogonal to the 1064 nm intracavity field before being reflected by the bending mirror 33 and absorbed in the Nd:YAG lasant material 35. Output radiation 34 at 459 nm is generated by nonlinear sum frequency mixing of this input beam 23 and the 1064 nm intracavity field.

In a similar device described in the Baumert et al. patent, approximately 1 mW of blue output was obtained at an input power of 275 mW. This corresponds to an overall conversion efficiency of about 0.36%. This conversion efficiency is substantially less than that observed with intracavity second harmonic generation or external resonant diode doubling.

Resonant enhancement of the signal in a single-input optical mixer in accordance with the present invention was previously thought unfeasible because the gain or lasant medium is strongly absorbed at the signal wavelength. It was thought that this phenomenon would preclude resonant enhancement of the signal input. It has now been discovered in accordance with the present invention that a gain medium can be efficiently pumped by a resonantly enhanced laser diode.

More specifically, in accordance with the present invention it has been discovered that if a single-mode laser is spatially and spectrally mode matched into an optical cavity through a mirror having transmission which is equal to the round trip losses in the cavity, the intracavity field will be increased by the reciprocal of that transmission relative to the input beam. In a resonantly pumped laser, one places a gain medium inside the cavity having a round trip absorption at the input wavelength which dominates all other intracavity losses. Generally, a single-pass absorption between 2% and 10% is adequate to achieve this condition although absorptions both greater and smaller than this can be implemented. If the input transmission is then impedance matched to the round trip loss, a power buildup approximately equal to the reciprocal pump absorption loss occurs inside the cavity. The power absorbed in the gain medium is equal to the product of this intracavity power and the round trip absorption in the gain medium. If the absorption pump power is approximately equal to dominant loss mechanism, the absorbed pump power is approximately equal to the power incident on the cavity. Thus, it is possible to absorb nearly 100% of the incident power in the gain medium and simultaneously enhance the input power inside the laser cavity. In a single-input upconverter in accordance with the present invention, the above method can be used to obtain significant signal enhancement in a single input device. The maximum signal enhancement in this embodiment of the invention is somewhat less than the two-input embodiment described above due to the absorption in the laser gain medium, but a significant improvement in conversion efficiency can still be achieved.

A specific example of a single-input, signal resonant sum frequency upconverter in accordance with the present invention is shown in FIG. 3. The output from a single-frequency 808-nm diode laser shown as 35 and 36 is spectrally and spatially mode-matched into a cavity which is resonant at both 808 nm and 1064 nm radiation. Gain medium 47 is a thin slab of 0.2% doped Nd:YAG having a round trip absorption at the signal wavelength of 10%. The single-frequency diode laser (35 and 36) is matched to the resonant cavity using the techniques known to those skilled in the art, as for instance those described in G. J. Dixon, C. E. Tanner and C. E. Wieman, Opt, Lett. 14, 731 (1989).

Input face 42 of the nonlinear crystal KTP 43 is coated for high reflectivity at 1064 nm and 10%-11% transmission at 808 nm. Inside face 50 of crystal 43 has an antireflective coating for 1064 nm and 808 nm and a high transmission coating at the 459-nm output sum frequency 49. Inside face 44 of the bending mirror 46 is highly reflective at both 808 nm and 1064 nm and highly transmissive at 459 nm at an incident angle of 45°. The 1064 nm transmissive coating on the mirror is designed to have sufficient polarization anisotropy to force the 1064 nm intracavity field to run in a single polarization. Outer surface 45 of mirror 46 has an antireflective coating for 459 nm at a 45° angle of incidence. The Nd:YAG gain medium 47 having a crystal thickness of 400 μm is polished flat and parallel and has antireflective coating on both faces at both 1064 nm and 808 nm. Cavity mirror 48 is concave with a 2.5 cm radius of curvature and is coated for high reflectivity at both 808 nm and 1064 nm radiation.

This device can have a pump buildup, i.e., ratio of circulating pump power within the cavity to pump power incident on the cavity, of approximately 10, resulting in an order of magnitude increase in the signal conversion efficiency over a non-signal-resonant device such as depicted in FIG. 2. Thus, at 275 mW input, one can expect an output power of 10 mW rather that 1 mW as observed in the non-signal-resonant device described in the Baumert et al. patent. The corresponding input conversion efficiency is 3.6%. At the 100 mW input power level currently obtainable from a single-quantum well diode laser, one can achieve an output power level exceeding 1.3 mW for a device prepared in accordance with the present invention.

As with the dual input device depicted in FIG. 1, there are a number of different embodiments o the basic single-input upconverter. For example, the ring resonator configuration depicted in FIG. 4 eliminates the need for optical isolation. In the ring resonator embodiment of invention, the output from a single-mode signal source is spatially mode matched into a ring resonator containing the gain medium and nonlinear crystal. Backreflection from the input mirror is eliminated since it is not colinear with the incident beam. Tilting the surfaces the intracavity components at an angle to the direction of propagation of the intracavity beam effectively eliminates back-reflections which could destabilize the single laser.

In particular, in accordance with the present invention, the ring laser upconverter depicted in FIG. 4 is used to sum radiation having wavelengths of 808 nm and 1064 nm in a nonlinear crystal, e.g. KTP. This device is a preferred embodiment of the present invention since it combines mechanical simplicity with a unidirectional output beam.

With reference to FIG. 4, the output from a single-mode, GaAlAs diode laser, shown as 52 and 53, is radiation 54 at 808 nm. Radiation 54 is collimated by an aspheric lens 55, having a high numerical aperture. Optionally, a beam circularizer 56 may be used to convert the elliptical output 54 of the diode laser to a circular beam which can be effectively mode matched to the $TEM_{00}$ mode of the ring laser resonator. Focusing lens 57 is used to match the collimated output of the diode laser (52 and 53) to the fundamental mode of the signal resonant sum frequency mixer. The mixer consists of 5 mm long rod of low-doped, Nd:YAG lasant material 59 which has a single pass absorption of approximately 4.5% at the peak of the 808 nm Nd absorption band. The surface of this rod are tilted at a small angle relative to the input beam direction so that the direct back-reflections from the surface are not imaged back towards the diode laser input. The Nd:YAG rod 59 is housed in a permanent magnet 58 which produces a rotation of linearly polarized light passing through it via the magneto-optic Faraday effect. A tilted waveplate 60 which has an effective retardation of ½ wave at 1064 nm and a full wave at 808.5 nm is placed between Nd:YAG rod 59 and KTP crystal 61. It is positioned so that the beam parallel to the axes of KTP crystal 61 and Nd:YAG rod 59 passes through it but the angled reflection from KTP crystal 61 does not. The combined effect of the Faraday rotation in Nd:YAG rod 59 and the waveplate 60 produce a net polarization rotation of zero degrees in one direction and a nonzero rotation in the other. This effect, coupled with the anisotropic reflection from the coated reflectors and the total internal reflection on the internal surface of KTP crystal 61, force the laser to oscillate in a single direction parallel to the direction of the propagation of the 808 nm input radiation 54. The polarization of the 808 nm intracavity field is slightly affected by the Faraday rotation in Nd:YAG rod 59 but the losses thus created are insignificant when compared to the absorption losses in the Nd:YATG gain crystal 59. The 5 mm long KTP crystal 61 is polished with a slightly angled interior surface 63 and a 2-cm convex output surface 64. One of the long sides of the crystal, side 65, is also polished to act as a total internal reflection surface for the ring laser modes at both 1064 nm and 808 nm. These modes are shown as a dotted line within the resonator in FIG. 4. Because there are no direct back-reflections to the laser diode, the need for optical isolation of the laser diode is eliminated.

Input face 66 of the Nd:YAG rod crystal 59 is polished flat and coated for approximately 10% transmission at 808 nm and high reflectivity at 1064 nm. The intracavity face 67 is flat and slightly angled with respect to the intracavity mode. Face 67 is antireflective coated at both 808 nm and 1064 nm as are both surfaces of waveplate 60. Nd:YAG rod 59 is housed in a permanent magnet 58 which produces a Faraday rotation of the polarization of light passing through it. The intracavity surface 63 of the KTP crystal 61 is angled with respect to the intracavity mode and similarly antireflective coated at both 808 nm and 1064 nm. The 21-cm convex output surface 64 is coated for high reflectivity at both 808 and 1064 nm and high transmission at 459 nm. KTP crystal 62 is oriented for phase matched sum frequency generated between the 808 nm pump beam and the 1064 nm laser.

In operation, the 1064 laser oscillates unidirectionally in a direction which is parallel to the direction of propagation of the 808 nm intracavity field. Elimination of the magnet and waveplate can be expected to result in bidirectional oscillation. Although sum frequency output is also possible in this case, mode competition between the two counter propagating modes of the laser has the possibility of creating instabilities in the laser output.

A number of techniques exist for locking the output wavelength of the diode laser to a resonance of the cavity. Because the laser diode wavelength can be controlled by the input current, a fast electronic servo loop which adjusts the injection current to maintain a mode match is comprehended by the present invention. A slower loop on controlling the temperature of the external cavity can be used to compensate for long-term, slow drifts of cavity length. Passive locking techniques of the type described in G. J. Dixon, C. E. Tanner and C. E. Wieman, Opt. Lett., 14, 731 (1989) may also be used to advantage with this resonator.

In a passively locked laser, a minor amount of the cavity radiation is returned to laser diode 53 as optical feedback. The precise amount of feedback required will be a function of the laser diode used. For example, the type of facet coating, if any, on the laser diode will have an effect on the amount of optical feedback required. Typically, however, less than about 5% of the cavity radiation will be required as feedback in the practice of this invention.

If necessary, the phase of the optical feedback to laser diode 53 can be adjusted by conventional means to maximize the resonant field within the cavity. For example, phase adjustment of the optical feedback can be accomplished by changing the spacing between the external optical cavity and diode laser 1 with a piezoelectric element, by changing the temperature of the structure separating these two components, or by incorporating an electro-optic element having a field-dependent optical path between the external optical cavity and diode laser 53.

The optical feedback from the external cavity to the laser diode is important because it makes it easier to match the laser diode frequency with that of the external cavity. This is a consequence of the fact that the feedback forces the laser diode to run at a frequency which satisfies the Fabry-Perot resonance condition for the external cavity.

What is claimed is:

1. A method for generating coherent optical radiation which comprises:
   (a) generating coherent optical radiation of a first frequency, $w_1$, from a lasant material within an optical cavity wherein said optical cavity is resonant with respect to said radiation of a first frequency;
   (b) generating coherent optical radiation of a second frequency, $w_2$;
   (c) introducing said radiation of a second frequency into said optical cavity, wherein said cavity is resonant with respect to said radiation of a second frequency, $w_2$; and
   (d) interacting said radiation of a first frequency and said radiation of a second frequency with a nonlinear optical material within the optical cavity to generate coherent optical radiation of a third frequency, $w_3$, whereby said resonant enhancement of both $w_1$ and $w_2$ within said cavity results in an increased output efficiency for said interacting step.

2. The method of claim 1 wherein a portion of said radiation of a second frequency $w_2$ is used to optically pump said lasant material and another portion of said radiation of a second frequency, $w_2$, is used to interact with said radiation of a first frequency, $w_1$, with said nonlinear optical material to generate said radiation of a third frequency, $w_3$.

3. The method of claim 2 wherein $w_3 = w_1 + w_2$.

4. The method of claim 2 wherein $w_3$ is the difference between $w_1$ and $w_2$.

5. The method of claim 2 wherein said lasant material is comprised of neodymium-doped YAG.

6. The method of claim 2 which additionally comprises modulating said radiation of a third frequency by modulating said radiation of a second frequency.

7. The method of claim 2 which additionally comprises adjusting and controlling the polarization of said radiation of a first frequency and the polarization of a said radiation of a second frequency to optimize the generation of said radiation of a third frequency.

8. The method of claim 2 wherein said nonlinear optical material comprises potassium titanyl phosphate.

9. The method of claim 2 wherein said radiation of a second frequency is generated from a source selected from the group consisting of laser diodes, laser diode arrays, diode-pumped solid state lasers, and diode-pumped semiconductor lasers.

10. The method of claim 1 wherein $w_3 = w_1 + w_2$.

11. The method of claim 1 wherein $w_3$ is the difference between $w_1$ and $w_2$.

12. The method of claim 1 wherein said radiation of a first frequency is generated by optically pumping a solid lasant material.

13. The method of claim 12 wherein said solid lasant material is optically pumped by optical pumping means selected from the group consisting of laser diodes, laser diode arrays, diode-pumped solid state lasers, and diode pumped semiconductor lasers.

14. The method of claim 12 wherein said lasant material is comprised of neodymium-doped YLF.

15. The method of claim 1 which additionally comprises modulating said radiation of a third frequency by modulating said radiation of a second frequency.

16. The method of claim 1 which additionally comprises adjusting and controlling the polarization of said radiation of a first frequency and the polarization of said radiation of a second frequency to optimize the generation of said radiation of a third frequency.

17. The method of claim 1 wherein said nonlinear optical material comprise potassium titanyl phosphate.

18. The method of claim 1 wherein said radiation of a second frequency is generated from a source selected from the group consisting of laser diodes, laser diode arrays, diode-pumped solid state lasers and diode-pumped semiconductor lasers.

19. The method of claim 1 which additionally comprises modulating said radiation of a third frequency by modulating said radiation of a first frequency.

20. The method of claim 1 which additionally comprises modulating said radiation of a third frequency by modulating both said radiation of a first frequency and said radiation of a second frequency.

21. An apparatus for generating coherent optical radiation which comprises:
   (a) means for generating optical radiation of a first frequency, $w_1$, within an optical cavity which is resonant for said radiation of a first frequency;
   (b) means for generating coherent optical radiation of a second frequency, $w_2$, which is located outside of said optical cavity, wherein said cavity is also resonant for said radiation of a second frequency;
   (c) means for introducing said radiation of a second frequency into said optical cavity; and
   (d) nonlinear optical means within said optical cavity for optically mixing said radiation of a first frequency and said radiation of a second frequency to generate coherent optical radiation of a third frequency, $w_3$, whereby said resonant enhancement of both $w_1$ and $w_2$ within said cavity results in an increased output efficiency of said optical mixing.

22. The apparatus of claim 21 wherein $w_3 = w_1 + w_2$.

23. The apparatus of claim 21 wherein $w_3$ is the difference between $w_1$ and $w_2$.

24. The apparatus of claim 21 wherein said means for generating coherent optical radiation of a first frequency comprises a solid lasant material which is optically pumped by optical pumping means comprised of at least one device selected from the group consisting of laser diodes, laser diode arrays, diode-pumped solid state lasers, and diode-pumped semiconductor lasers.

25. The apparatus of claim 24 wherein said lasant material is comprised of neodymium-doped YLF.

26. The apparatus of claim 24 wherein said means for generating said radiation of a second frequency is the same as said optical pumping means and is used to both optically pump said lasant material with said radiation of a second frequency and to supply said radiation of a second frequency for interacting with said radiation of a first frequency within said nonlinear optical means.

27. The apparatus of claim 31 wherein $w_3 = w_1 + w_2$.

28. The apparatus of claim 31 wherein $w_3$ is the difference between $w_1$ and $w_2$.

29. The apparatus of claim 31 wherein said lasant material is comprised of neodymium-doped YAG.

30. The apparatus of claim 26 which additionally comprises temperature control means for adjusting and controlling the temperature of said means for generating said radiation of a second frequency.

31. The apparatus of claim 26 which additionally comprises means for modulating said radiation of a second frequency.

32. The apparatus of claim 26 which additionally comprises polarization means for controlling the polarization of said radiation of a first frequency an the polarization of said radiation of a second frequency.

33. The apparatus of claim 26 wherein said nonlinear optical means is comprised of potassium titanyl phosphate.

34. The apparatus of claim 21 wherein said means for generating radiation of a second frequency is selected from the group consisting of laser diodes, laser diode arrays, diode-pumped solid state lasers, and diode-pumped semiconductor lasers.

35. The apparatus of claim 34 which additionally comprises temperature control means for adjusting and controlling the temperature of said means for generating said radiation of a second frequency.

36. The apparatus of claim 21 which additionally comprises means for modulating said radiation of a second frequency.

37. The apparatus of claim 21 which additionally comprises polarization means for controlling the polarization of said radiation of a first frequency and the polarization of said radiation of a second frequency.

38. The apparatus of claim 21 wherein said nonlinear optical means is comprised of potassium titanyl phosphate.

39. The apparatus of claim 21 which additionally comprises means for modulating said radiation of a first frequency.

40. The apparatus of claim 21 which additionally comprises means for modulating both said radiation of a first frequency and said radiation of a second frequency.

* * * * *